Dec. 17, 1940.  J. CRAWFORD  2,225,158
CURRENT REGULATOR
Filed Jan. 13, 1938
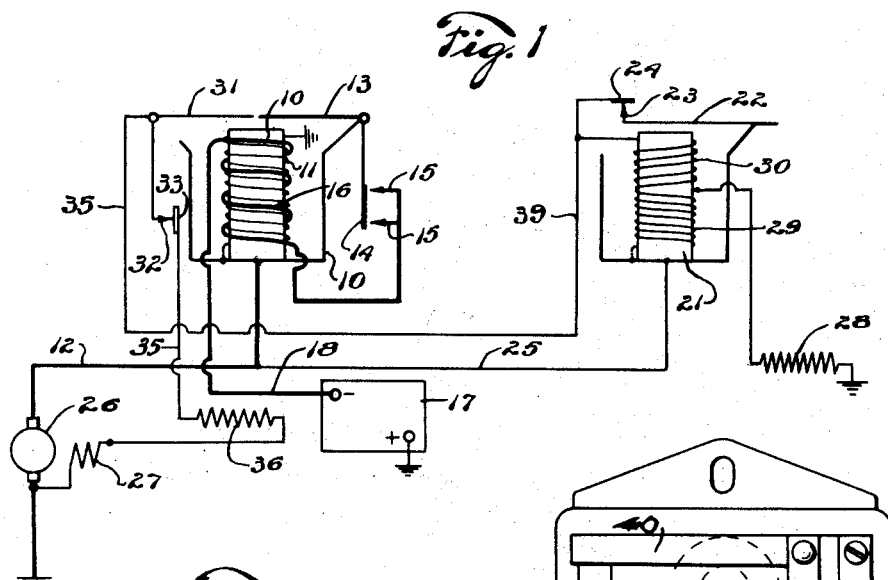
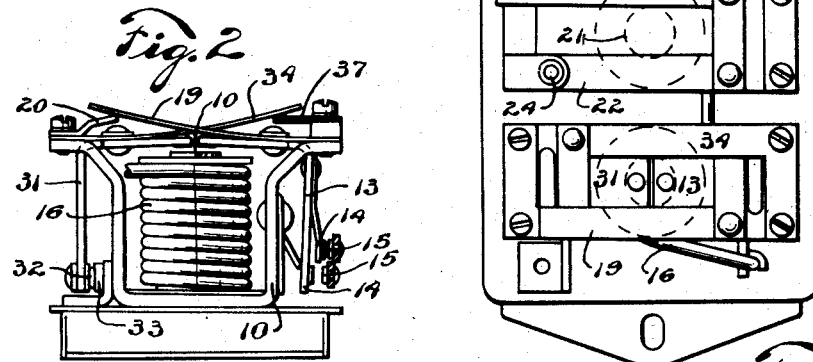
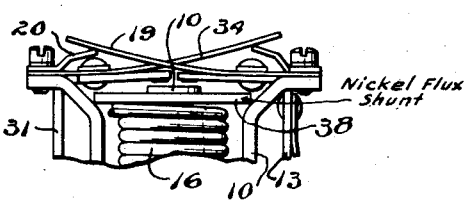
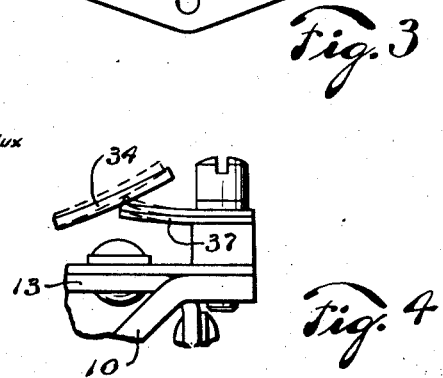
INVENTOR
John Crawford
BY
E. L. Davis
Edwin C. McRae
ATTORNEYS
WITNESS
Edmund Witzke Patented Dec. 17, 1940

2,225,158

UNITED STATES PATENT OFFICE 2,225,158

CURRENT REGULATOR

John Crawford, Detroit, Mich., assignor to Ford Motor Company, Dearborn, Mich., a corporation of Delaware Application January 13, 1938, Serial No. 184,725

8 Claims. (Cl. 171—314)

The object of my invention is to provide a current regulator for use in connection with motor vehicles. My improved regulator is adapted to be used in combination with a generator and storage battery to control the output current of the generator so that the battery is maintained in its fully charged condition at all times. This is accomplished, as in other regulators, by controlling the generator field excitation in accordance with the voltage generated so that excessive voltage is prevented irrespective of the speed of the generator. Thus, the generator will maintain the battery fully charged but will not generate voltage which will burn out lamp bulbs, etc.

My improved regulator is of the vibrating type, or one wherein a resistance is intermittently inserted in the field circuit of the generator, the ratio of the accumulated time with the resistance in and without the resistance being controlled by the voltage of the generator output. However, my improved device differs from the conventional vibrating type regulator, just described, in that means is provided which functions when the generator is overloaded to break the generator field circuit and thereby prevent damage to the generator or accessories. Thus, should the vibrating points of the regulator become stuck together, which would overload the generator, then the current output will be stopped to prevent damage.

Because of the above mentioned unique feature of my improved regulator, a shunt-wound generator may be safely used therewith instead of the conventional third-brush type of generator. Heretofore, it was deemed advisable to use the third-brush type of regulator on a generator which was used with a vibrating type regulator. The reason for this precaution was that in case the vibrating points became stuck, the current generated by the third-brush type of generator would reach its maximum at a low speed and fall off with higher speeds to thereby prevent damage to the generator. With a shunt-wound generator the current increases with the speed so that at high speeds the field windings of the generator would be burned up.

The advantage of using a shunt-wound generator in preference to a third-brush type in combination with a vibrating regulator is that the field current required by a third-brush generator is approximately four times the field current required with a shunt-wound generator. For example:—A third-brush regulated automobile generator having a capacity of 25 amperes at 7 volts requires a field current of between 5 and 6 amperes; while a shunt-wound generator of equal capacity requires only 1 to 1½ amperes' field excitation. Inasmuch as the vibrating contact points in this type of regulator must interrupt the field circuit, it will be apparent that a much longer life for the contact points is gained by reducing the field strength to 1½ in comparison to 6 amperes ordinarily required.

The purpose of my improved regulator is therefore to provide a vibrating regulator for regulating the output current of a shunt-wound generator and which will not be subject to the hazard caused by the failure of the vibrating points or by overloading of the generator.

Specifically, my invention consists of an interrupter in the field circuit of the generator, which interrupter is actuated by the current generated when its value reaches an unsafe limit. The unique feature of the interrupter is that it is actuated by the conventional current coil of the generator cut-out and remains in its interrupting position until after the current output is reduced to an amount which allows the cut-out to open. This causes a relatively slow cycle of operation, as will later be described, which slow cycle causes a back and forth movement of the vehicle ammeter hand to thereby warn the operator that the vibrator has failed. This function is not obtainable where only an auxiliary vibrator is provided.

Still, a further object of my invention is to provide means which compensates for the effects of temperature variations to thus insure a uniformly maximum current output from the generator.

With these and other objects in view, my invention consists in the arrangement, construction and combination of the various parts of my improved device, as described in the specification, claimed in my claims and illustrated in the accompanying drawing, in which:

Figure 1 is a diagrammatic wiring diagram of my improved regulator.

Figure 2 is an end view of one form of my regulator.

Figure 3 is a plan view of the regulator, shown in Figure 2.

Figure 4 is an enlarged view of the temperature compensating device shown in Figure 2, and Figure 5 is a fragmentary end view of an alternate form of regulating device wherein temperature compensation is made by forming a portion of the actuating core from metal having such characteristics that the flux density remains constant even though a greater current is being conducted through the current winding of the regulator because of the reduction in ambient temperature.

Referring to the accompanying drawing, I have shown one form of my device in which numeral 10 is used to indicate the core or frame of a conventional generator cut-out. A high resistance winding 11 is wound around the center portion of the frame 10, one end of which is grounded while the other end is connected to the frame 10 which is, of course, insulated from the generator. A wire 12 extends from the "hot" side of a shunt-wound generator 26 to the frame 10 so that the generator potential is impressed upon the winding 11 at all times. The shunt field winding of the generator is shown at 27.

A cut-out armature 13 is pivotally mounted at one side of the cut-out and is provided with movable contact points 14 which are adapted to co-act with stationary points 15 to complete an electrical circuit from the frame 10 through the armature 13 and the contact points 14 to the stationary points 15. The points 15 are electrically connected to a heavy current winding 16 which is wound over the winding 11. The other end of the winding 16 is connected to the negative pole of a vehicle battery 17 through a lead 18. The positive pole of the battery is grounded. The armature 13 is resiliently urged out of the field of force produced by the windings 11 and 16 by means of a leaf spring 19. The spring 19 is adjustable by bending an ear 20 upon which its free end is supported upwardly or downwardly. When the armature 13 is drawn by the winding 11 the points 14 and 15 are closed.

The cut-out contact points 14 and 15 have been shown in pairs, the purpose of which is to prevent or reduce arcing at these points. No claim is made herein for this arrangement of points but it may be well to mention that by breaking one of the cut-out contact points ahead of the other the resistance of the circuit can be gradually increased to thereby reduce arcing of the points.

In operation with a 6-volt battery, current is generated by the generator 26 and flows through the high resistance winding 11 until it reaches about 7 volts at which time the armature 13 is drawn by the field from the winding 11 to close the points 14 and 15. The current is now permitted to flow through the winding 16 into the battery 17. The armature 13 is held closed by the flux produced by the winding 16. The air gap between the frame and the armature is adjusted so that the spring returns the armature to its open position when the voltage generated is reduced to about 4½ volts. The reverse current in the winding 16 at this time assists the spring in returning the armature. The above described device is a conventional cut-out mechanism, except that the armature 13 only obstructs half of the frame pole so that room for an interrupter armature is available.

The vibrating regulator used is also quite conventional and consists of a core 21 having an armature 22 pivotally mounted thereon. A spring 40 urges the armature away from the core 21. A movable contact point 23 is mounted upon the free end of the armature 22 and is adapted to coact with a stationary contact point 24 to form an electrical circuit between the core 21 and a lead 39. The wire 12 is connected to a lead 25 which is connected to the core 21. Thus, when the device is inoperative, a circuit is established from the lead 39 through points 24 and 23 to the core 21. The core 21 is connected to the cutout frame 10 by leads 25 and 12, so that the lead 39 is energized when the cutout closes. A regulator winding 29 is provided on the core 21, one end of which is connected to the core and the other end of which is grounded through a resistance 28. A reverse winding 30 is also provided on the core 21 but is wound in the opposite direction to winding 29. One end of the winding 30 is connected to the grounded end of the winding 29, while the other end is connected to the lead 39 which extends back to the cut-out. The armature spring 40 is adjusted so that when about 8 volts are impressed upon the winding 29 the armature will be drawn downwardly to open the contact points 23 and 24. The result of closing the contacts 23—24 is that the coils 29—30 are both short-circuited with respect to the field current so that the field circuit resistance is a minimum.

From the foregoing it will be noted that current from the battery 17 is at times conducted through the lead 18 to the current winding 16 which is connected with the points 15. When the generator is inoperative, the points 14 and 15 are open so that the hot side of the circuit is stopped by these points. However, when the generator is in operation, the points 14 and 15 are closed to thereby allow current from the battery to energize the frame 10. The regulator core 21 is, however, normally energized by the output of the generator through leads 12 and 25. This core is connected by means of armature 22 and points 23 and 24 with the lead 39, which lead extends back to the cutout assembly instead of directly to the field winding of the generator, as has previously been the custom. In this construction the lead 39 is connected with the field winding through a pair of operable contact points which are inserted in the circuit and which are controlled by the flux density in the cutout core so as to open the connection between the lead 39 and the field winding when the current in the cutout core becomes excessive.

In operation, the cutout being closed, the contact points 23 are closed with the current flowing from the lead 25 through the armature 22, points 23 and 24 and directly to the lead 39, thereby shorting out the reverse winding 30. A small amount of current flows through the winding 29 and resistance 28. When the voltage impressed upon the winding 29 reaches 8 volts, the points 23 and 24 are opened so that the current flows from the winding 29 through the reverse winding 30 to produce a bucking flux which annuls the flux of winding 29 thereby allowing the spring 40 to return the armature upwardly to again close the points. Thus, a rapid cycle of operation or vibration results. Even though there is no break in the current flow, due to the opening of the points 23 and 24, still the rate of change in potential is so rapid that some sparking at the contact points occurs. The drop in potential is due to the resistance of the windings 29 and 30.

It has been customary in the past to connect the regulator, just described, directly with the field winding 27 of the generator to thereby vary the generator field strength in accordance with the voltage generated. The disadvantage of this construction is that in case the points 23 and 24 become pitted or freeze together, as sometimes happens, then the full voltage of the generator is impressed upon the field 27 at all times. As has been mentioned, for this reason a third-brush type of generator control has heretofore been used with vibrating regulators, as the current output does not increase at higher speeds. It is very desirable to use a shunt-wound generator but the current output of a generator capable of maintaining the battery charged at ordinary speeds increases at high speeds sufficiently to burn out the field windings. Consequently, should the regulator points stick, using a shunt-wound generator, the generator windings would be burned up at high operating speeds after only a few minutes of operation.

The contact points 23 and 24 are required to conduct the current required to energize the field so that less danger of pitting results when a shunt-wound generator is used. However, even with the lessened danger of pitting sticking of points does sometimes occur which, with a shunt generator, has heretofore been disastrous. I have provided means for preventing damage to the generator from the above mentioned cause. To accomplish this I have provided an interrupting armature 31, which is pivotally mounted on the frame 10 and operates a movable contact point 32 in and out of engagement with a stationary point 33. When the armature 31 is drawn downwardly, contact between the points 32 and 33 is broken and inversely, when it is in its upper position the points are closed. A spring 34 is connected to the armature 31 which urges the armature to position where the contact points 32 and 33 are closed.

The field winding 27 of the generator is connected to a ballast resistor 36 which, in turn, is connected to the stationary contact point 33. This point is normally in contact with the movable point 32 which is connected to the lead 39. The lead 39 extends to the stationary point 24 of the regulator, so that the field circuit is conducted through the points 24 and 23 to the armature 22 which is connected to the core 21 of the regulator. Core 21 is connected by leads 25 and 12 to the frame 10 of the cutout, which frame is connected by means of points 14 and 15 with one end of the cutout current coil 16. The other end of the coil 16 is connected by means of a lead 18 with the hot side of the battery 17. Thus, the field winding 27 is connected to the battery 17 with the points 32 and 33, points 23 and 24, and points 14 and 15, all in series with each other, so that to complete the field circuit all of the points must be closed. When the generator is inoperative, the cutout points 14 and 15 are open to prevent the discharge of the battery through the field circuit, as is the primary purpose of the cutout. When the points 23 and 24 open due to the operation of the regulator, the field circuit is in effect broken and the duration of the intervals that these points remain closed regulate the intensity of the field circuit. The points 32 and 33 are normally closed but when the flux in the cutout circuit becomes excessive due to an overload in the generator, then these points open to thereby break the field circuit. In operation the field winding is energized directly by the output of the generator through leads 12 and 25.

It will be noted that the regulator core 21 is only energized from the battery through the cutout points 14 and 15 and consequently when the device is inoperative, no current flows through the regulator winding 30 or reverse winding 29. However, when the generator is in operation, the voltage generated is impressed upon the regulator core 21. Both windings 30 and 29 are connected to the ground through the resistor 28, so that some current flows through each of these windings to the ground. However, the windings 30 and 29 are wound of very fine wire, so that the amount of current lost through these windings is very small. The residual magnetism in the generator armature is sufficient to build up the field circuit in the generator for starting.

During normal operation of the regulator the maximum current generated is not sufficient to move the armature 31 against the force developed by the spring 34. However, when the points 23 and 24 become stuck together and the current generated becomes dangerous, that is about 9 volts, then sufficient current flows through the winding 16 to draw the armature 31 downwardly and thereby open the points 32 and 33. The armature is allowed to contact the frame 10 and is held in this position until the current in winding 16 is reduced to 4 volts. A wire 35 extends from the stationary point 33 to a ballast resistor 36, the other terminal of this resistor being connected to the field winding 27. Consequently, during operation the regulated field current is conducted through the points 32 and 33 and through the ballast resistor to the field winding. It is only in case an overload current is being generated that the armature 31 is drawn downwardly to thereby break the field circuit before damage is done to the generator.

It may be thought that the points 32 and 33 will operate as an auxiliary vibrator. However, this is not the case. The armature 13 is held downwardly by the current generated until the current drops off to a value less than that required to hold the cut-out closed. The points 32 and 33 close only after the cut-out points have opened. When the cut-out is opened the current in the coil 16 is interrupted to allow the armature 31 to return to its uppermost position and complete the circuit through points 32 and 33. If the points 23 and 24 are still stuck together after one cycle, as is usually the case when they have once become stuck, then the current again builds up in the generator to cause a repetition of the above mentioned cycle. However, it takes an appreciable time for the current to build up in the generator to that required to open the interrupter points. This cycle of operation with a conventional automobile generator occurs at a frequency of from 40 to 60 cycles per minute. As this frequency is less than 1 cycle per second the pointer of the vehicle ammeter swings back and forth following the output of the generator. The swinging ammeter pointer is very noticeable to the operator of the car and gives him a visual warning that the electrical system is not functioning properly. Further, a clicking noise is produced by the armature 31 striking against the frame 10 which further warns the operator of the overloaded condition of the circuit. This cycle of operation is materially different from that of an auxiliary voltage responsive vibrator because the operation of such vibrator would in no way indicate to the driver that the primary vibrator had failed. Thus, he would most likely continue to use the auxiliary vibrator, without knowing of the failure of the primary vibrator, until the auxiliary vibrator failed. Then no protection would be had and the generator would be overloaded.

It is quite important that the point at which the above described interrupter breaks the circuit be controlled in accordance with the ambient temperature of the coil 16 to thus at all times allow full capacity operation of the generator and still prevent the various light bulbs used on the car from burning out, due to excessive voltage. The resistance of the coil 16 is materially lower in winter than in summer so that if the spring 34 were adjusted to prevent interruption of the circuit at a voltage sufficient to fully charge the battery in winter, then excessive voltage would be required to force sufficient current through the coil 16 to operate the armature against this spring pressure in warm weather. This would cause the light bulbs to burn out. I have provided means to compensate for this increase in conductivity, due to a reduction in temperature, which comprises an anchor 37 interposed between the frame 10 and the anchored end of the spring 34. The anchor 37 is formed of bi-metal and is positioned so that upon a reduction in temperature its free end raises to increase the tension on the spring 34. The function of the anchor 37 is illustrated in Figure 4 which shows in full lines the position of the spring and the bi-metal strip during summer operation and shows in dotted lines the position of the strip and spring in winter operation.

It may be desirable to dispense with the bi-metal anchor member 37 and compensate for temperature variations by other devices. An alternate means has been provided, as shown in Figure 5. This means comprises a nickel strip 38 which bridges the air gap at the top of the frame 10. Nickel has the well known characteristic of increasing its resistance to magnetic flux upon an increase in temperature. By properly proportioning the strip 38 the flux density effective on the armature can be maintained uniform irrespective of all ambient temperature changes.

Among the many advantages arising from the use of my improved construction, it may be well to mention that a negligible increase in cost over the conventional vibrating regulator is entailed by the use of my improved construction. My improved device requires only the addition of a relatively simple armature and pair of contact points. It thus has a commercial advantage over those types of regulators which employ a separate frame, winding armature etc. for the protecting device.

Furthermore, synchronizing the cut-out armature with the interrupter armature produces a time lag in the cycle to thereby provide a very slow frequency of operation for the interrupter, which function it is not believed possible with other devices of this nature.

The principal advantage of this construction is that a shunt-wound generator may be safely employed for automotive use without the danger of burning up the generator or lights of the vehicle. As such generator requires only a fraction of the field current required with a series generator or a generator employing third-brush regulation, the current flow through the regulating points is exceptionally small. This materially assists in prolonging the life of the regulating points to thereby make replacement of such points less frequent.

Some changes may be made in the arrangement, construction and combination of the various parts of my improved device without departing from the spirit of my invention, and it is my intention to cover by my claims such changes as may reasonably be included within the scope thereof.

I claim as my invention:

1. In combination, a generator having a field circuit, a current operated generator cut-out, a regulator controlling the field excitation of said generator, said regulator being responsive to the generator voltage, an interrupter relay disposed in said regulator and field circuit, said interrupter being actuated by the flux produced by said cut-out to open said field circuit only after the current in said cut-out reaches a value materially above the value at which said cut-out is closed, and said interrupter relay upon a reduction in current through said cut-out being held in its above mentioned open position until after said cut-out opens.

2. A generator regulator system including a generator having a field circuit and comprising, a cut-out assembly actuated by the current from the generator, a vibrating type of regulator actuated by the voltage generated by said generator to vary the field strength of said generator inversely with variation in the voltage generated, and an interrupter switch interposed in said regulator and field circuit, said switch being opened by said cut-out only after the current therein reaches a value materially above the value at which said cut-out is closed, and said switch being held in said open position by said cut-out until the current therein is reduced to a value below that at which said cut-out is opened.

3. A generator regulator system including a generator having a field circuit and comprising, a pair of cut-out contact points, a cut-out coil actuated by the current from the generator to close said cut-out contact points upon the output current of the generator reaching a predetermined value, a vibrating type of regulator actuated by the voltage generated by said generator to vary the field strength of said generator inversely with variations in the voltage generated, and an interrupter switch interposed in said regulator and the field circuit, said switch being opened by the flux generated by said coil only after the current in said coil reaches a value materially above the value at which said cut-out points are closed, and said switch being held in its closed position by said coil until the current therein is reduced below the value at which said cut-out points are opened.

4. A regulator system including a generator having a field circuit, a battery, a current coil energized by said generator output, a cut-out armature mounted within the field of force of said coil, a pair of cut-out contact points closed by said armature to connect the generator and battery upon the flow of current in said coil sufficiently to charge said battery, a voltage regulator mounted in series with the output terminal of said generator and the field winding thereof, said regulator varying the generator field excitation inversely with variations in the voltage generated, a pair of interrupter contact points inserted in said regulator and field circuit, and an interrupter armature mounted within the field of force of said current coil, said armature opening said interrupter points only after the current through said coil increases to a value materially above the value at which said cut-out points are closed, and said interrupter armature being held in its open position by said coil until the current therein lowers to a value below that at which said cut-out points close.

5. A regulator system including a generator having a field circuit, a battery, a cut-out unit having a current coil associated therewith and having a high resistance coil therein which is energized by the output current from said generator, said cut-out unit also having a pair of contact points and an armature actuated by the field of force of said high resistance coil to close said points and connect the generator and battery through said current coil upon a flow of current in said high resistance coil sufficient to charge said battery, a regulator energized by the voltage of said generator to vary the flow of current through the generator field winding inversely to variations in the voltage of said generator current, a pair of interrupter contact points connected between said regulator and said generator field, and an interrupter armature actuated by the flux of said current coil to open said interrupter points only after the current from said generator attains a value materially above the value at which said cut-out points close, and said armature being held in said open position by said flux until the generator current lowers to a value below that at which said cut-out points open.

6. A regulator system including a generator having a field circuit comprising, a cut-out assembly having a current coil associated therewith which is energized by the current from said generator, a vibrating type of regulator actuated by the voltage generated by said generator to vary the field strength of said field circuit inversely to the voltage generated, an interrupter switch interposed in said regulator and field circuit, and an armature adapted to control said switch, said armature being spring urged to a position in which said switch is closed, and said armature being actuated by the flux produced in said cut-out to open said switch only after the current in said cut-out reaches a value materially above the value at which said cut-out is closed, and said armature being held in said open position by said flux until said current is reduced to a value below that at which said cut-out opens.

7. A generator regulator system including a generator having a field circuit and comprising, a cut-out assembly actuated by the current from the generator, a vibrating type of regulator actuated by the voltage generated by said generator to vary the strength of said generator field circuit inversely with variations in the voltage generated, an interrupter switch interposed in said regulator and the generator field circuit, an armature pivotally mounted adjacent to said cut-out assembly, said armature opening and closing said switch, a spring associated with said armature adapted to urge the armature to a position where said switch is closed, said spring being of such tension that said armature may be actuated to open said switch only after the current in said cut-out attains a value materially above the value at which said cut-out closes, said armature being held by said cut-out in its open position until the current therein is reduced to a value below that at which said cut-out opens, and a bi-metal anchor for said spring mounted upon said cut-out, which anchor increases the tension produced by said spring upon a reduction in ambient temperature.

8. A generator regulator system including a generator having a field circuit and comprising, a cut-out assembly actuated by the current from the generator, a vibrating type of regulator actuated by the voltage generated by said generator to vary the strength of the generator field circuit inversely with variations in the voltage generated, an armature mounted upon said cut-out assembly and actuated by the flux produced by the cut-out, a spring associated with said armature which resiliently urges said armature out of the field of force generated by said cut-out, a pair of contact points opened and closed by movement of said armature, said contact points being interposed in the regulator and generator field circuit, said spring having sufficient tension that said contact points are opened only after the current therein reaches a value materially above the value at which said cut-out is closed, said armature being held in said open position by said field or force until the current in the cut-out is reduced to a value below that at which said cut-out is opened, and a nickel strip forming a portion of the magnetic field circuit of said cut-out, said strip increasing the resistance of said magnetic field circuit in proportion to the increased conductivity of said cut-out resulting from a reduction in ambient temperature.

JOHN CRAWFORD.